July 13, 1965  J. C. JEROME  3,194,686
GALVANIC THERMAL BATTERY CELL
Filed Jan. 6, 1956

INVENTOR
J. C. JEROME

BY
ATTORNEYS 3,194,686
GALVANIC THERMAL BATTERY CELL
Joseph C. Jerome, Hyattsville, Md., assignor to the United States of America as represented by the Secretary of the Navy
Filed Jan. 6, 1956, Ser. No. 557,815
6 Claims. (Cl. 136—90)
(Granted under Title 35, U.S. Code (1952), sec. 266)

The invention described herein may be manufactured and used by or for the Government of the United States of America for governmental purposes without the payment of any royalties thereon or therefor.

This invention relates to thermoelectric generators composed of a series of similar miniature battery cells electrically serially interlinked to form a chain of thermal battery cells, and more particularly is directed to thermoelectric generators of the cell type having a source of heat energy and an associated electrical energy generating unit.

In the field of ordnance projectiles, missiles and the like, it is necessary to utilize thermoelectric generators which are small in size, simple and rugged in construction. Although conventional thermoelectric generators of this type are satisfactory for many applications, none have been found to be wholly satisfactory for use in ordnance missiles, inasmuch as setback forces and centrifugal forces during the flight of the projectiles introduce deformation of the elements and leakage of the electrolyte.

With the foregoing in mind, it is an important object of this invention to provide a new and improved thermoelectric generator which avoids the disadvantages encountered in applications to ordnance projectiles.

It is another object of this invention to provide a thermoelectric cell which will operate efficiently and reliably as a power source in an ordnance missile.

A further object is to provide a thermoelectric cell which is not susceptible to deformation when subjected to centrifugal and acceleration forces of the magnitudes existing in ordnance missiles upon firing and in flight thereof.

A still further object is to provide a thermoelectric cell wherein the maximum available heat energy present therein is utilized for the generation of electrical energy.

A significant object of the present invention is to provide a thermal battery cell adapted to be electrically serially interlinked with a series of like battery cells to form a chain of thermal battery cells.

Another further object is to provide a thermal battery composed of a series of like thermoelectric generator cells wound into a spiral configuration.

Another significant object is to provide thermoelectric cells which are miniature and of rugged and simple construction and adapted to be easily interlinked to form a chain of cells.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
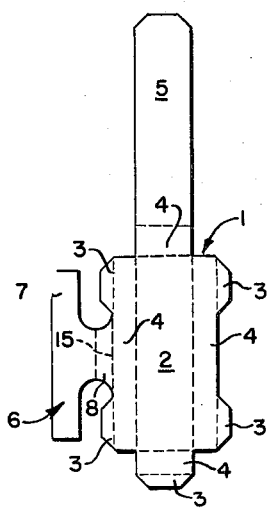
FIG. 1 is a plan view of the cell casing as it appears before being bent into a cup-shaped casing.

Referring now to FIG. 1, there is shown a cell casing indicated generally as 1, which is formed, as by stamping, out of sheet metal such as nickel-steel, or preferably nickel, or of like material. The casing 1 is bent sharply along the illustrated dashed lines to form a cup-shaped casing having a bottom wall 2, crimping side flanges 3, sidewalls 4, top or retainer wall 5, and linking tab 6 which has an enlarged rectangular portion 7 and neck portion 8 connecting the tab to the cell casing. The interior of the cup-shaped member and the interior face of lid 5 are calcium coated, as will be more fully described with respect to FIG. 3.

Figure 2:
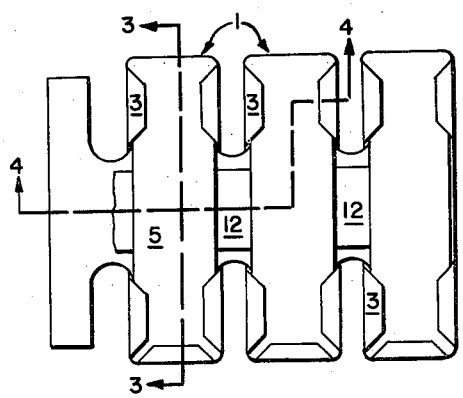
FIG. 2 is a plan view of a linkage of cells according to a preferred embodiment of the invention.

FIG. 2 illustrates a thermoelectric battery formed by a series of like thermoelectric generating cells constructed in accordance with the instant invention. More specifically, there is illustrated in FIG. 2 the manner in which conductive tabs 7 are disposed within the immediately adjacent cup-shaped member with lid 5 of each unit rigidly clamped thereover by crimping flanges 3 to retain the constituents within each cup-shaped member to thereby form a chain of serially interlinked cells. In addition to the tab 7 interlinking the cells, there is provided a strip of heat paper, indicated generally as 12, which is cut into a continuous strip of H patterns.

Although the heat source pads 12 have been described and shown in FIG. 2 to be continuous strip of H patterns, it is to be understood that, in lieu of a continuous strip, each cell may contain an individual pad of rectangular shape corresponding to the area of the bottom wall 2 and completely encased within the cell; or individual pads of rectangular configuration with a length greater than the length of the cells may be retained in each cell and so disposed as to have an end portion thereof protruding from one end of their respective cells. Furthermore, it is to be understood that the cell chain arrangement shown in FIG. 2 is not restricted to the strip form illustrated but may readily be formed into a spiral configuration by additional bending of the neck portion 8 of cell casing 1. If it is desired to form a thermoelectric battery from a single cell, the interlinking tab 7 may be severed from the remainder of the cell casing 1 along the dotted line 15 (FIG. 1), it being understood that the single cell includes a conductive member of the configuration of tab 7 to form an electrode therefor, as is more fully apparent from FIG. 3.

Figure 3:
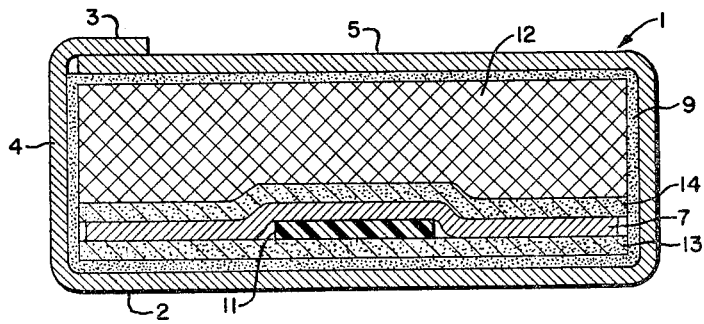
FIG. 3 is an enlarged cross-sectional view taken on line 3—3 of FIG. 2.

Referring now to the enlarged cross-sectional view of FIG. 3, there is shown the internal contents of each cup-shaped cell as taken along the longitudinal line 3—3 of FIG. 2. The interior of the cup-shaped member, namely bottom wall 2 and sidewalls 4, and the interior face of lid 5, has a calcium coating 9 deposited thereon. Disposed in the bottom of the cup-shaped member and on top of the calcium deposit 9 is a rectangular pad, or powder layer, of electrolyte material 13. The electrolyte 13 is of a eutectic mixture, or composition, such as lithium and potassium chlorides, adapted to be converted from a solid non-conductive state to a liquid conductive state upon application of a predetermined quantity of heat energy. Superposed on the electrolyte pad 13 is the conductive tab 7 from the preceding cup-shaped member, the central portion of tab 7 being upraised so as to house an insulator 11 to prevent tab 7 from coming in contact with sidewall 4, as is more clearly explained hereinafter in connection with FIG. 4. A layer of electrolyte 14 is placed over tab 7 and the remaining space of the cup-shaped member is filled with a heat paper pad 12. The lid 5 is folded over and crimped in place by crimping flanges 3. Thus, the cup-shaped member contains two half-cell units, one unit of which consists of the calcium deposit 9 as the negative electrode on bottom wall 2, the electrolyte 13 and the bottom face of tab 7, forming the positive electrode and the other unit of which consists of the upper face of tab 7 forming the positive electrode, the electrolyte 14 and the calcium deposit on lid 5 defining the negative electrode. Upon ignition of the pad 12, which ignition is effected by igniting pad 12 in any suitable manner, the electrolytes 13 and 14 melt, thereby enabling conduction between the electrodes to generate the desired potential.

The heat paper pad 12 is composed preferably of a thermite mixture or other similar exothermic chemical mixture adaptable to generate a large quantity of heat energy upon being activated as by the firing of an explosive device, such as a primer or detonator, in proximity therewith. A suitable thermite mixture for use in the instant invention is disclosed in U. S. Patent No. 2,457,860 to O. G. Bennett and Jack Dubin, issued on January 4, 1949. Another suitable heat paper consists of spun glass ribbon having a thickness of about .003" which has been immersed in liquid zirconium and dried. Another satisfactory compositional form of heat paper is a porous paper, of approximately .003" thickness, impregnated with aluminum silica beads of 1 to 3 mil. diameter, the impregnation process being carried out while the porous paper is in a wet condition. After impregnation, the paper is dried and then treated with a zirconium slurry after which treatment the paper is dried and ready for use as a heat paper pad in any configuration in the herein described battery cell.

Pad 12 constitutes the heat energy source for actuating the electrical generating unit of the subject invention. The area of pad 12 enclosed within each cell is preferably made equivalent to that of bottom wall 2 to insure that the pad will be firmly positioned and not displaced when subjected to centrifugal and acceleration forces of the magnitudes existing in an ordnance missile upon firing and while in flight. The area of tab 7 is smaller than that of pad 12 in order to admit air into the cell casing 1 for enabling proper operation of the thermoelectric generator.

In addition to the advantage of a firm support for the elements within the cell casing as provided by the above method of assemblage, an additional advantage is realized by the proximate relationship of the heat source and the electrical generator inasmuch as the optimum transfer of available heat energy is obtainable.

Figure 4:
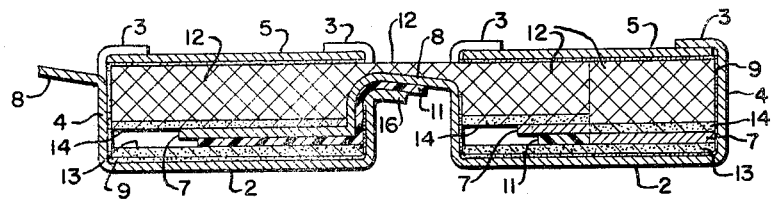
FIG. 4 is an enlarged cross-sectional view taken on line 4—4 of FIG. 2.

The cross-sectional view of FIG. 4 more clearly shows the manner in which the cells are interlinked to form a thermoelectric battery consisting of a chain of thermoelectric cells. As is shown thereon, the linking tab 6 serves as the conductive connecting element between the cells. In order to prevent the possibility of contact between the tab 6 and sidewall 4, thereby shorting out the electrical generating unit, an additional element is incorporated in the cell assembly such as the rectangularly shaped insulating spacer 11 interposed between these elements. To prevent the possibility of puncturing the spacer 11 by the sidewall 4 and to more firmly anchor spacer 11, a bend is formed in sidewall 4 to form a flange 16 to conformingly adjoin the spacer 11. FIG. 4 also clearly shows the use of the continuous strip of heat pad 12.

It is to be understood that although the heat pads have been described herein as being formed either of an H shaped or rectangular pattern so as to be conformingly arranged within the cell casing, the lengthwise dimension of the pad may be lengthened so that the pad protrudes from the cell assembly. This arrangement is especially desirable where the cell chain is wound into a spiral configuration and it is desired to simultaneously activate each cell. To accomplish this, a separate heat pad disc is placed over the spiral configuration and in contact with the exposed portion of the individual cell heat pads. Activation of the disc shaped heat pad would simultaneously activate each individual heat pad.

Obviously many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. A thermoelectric cell comprising, a pair of thermally responsive half-cell units supercoincidently retained within a housing and having an electrode in common, a normally latent thermal energy unit retained within said housing in proximate relationship with said pair of units for heating said pair of units upon activation of said thermal energy unit, said thermal energy unit consisting of spun glass ribbon pretreated with zirconium, said housing being defined by an enclosed casing having the interior thereof coated with calcium whereby the calcium coating on a pair of opposing sides of said casing defines the other electrode, respectively, of each of said pair of units, and an electrolyte interposed between said common electrode and the calcium coating on each of said pair of opposing sides whereby said common electrode and the calcium coating on said pair of opposing sides form the cathode and anode, respectively, for each of said half-cell units, said electrolyte being of such substance as to be conductively ineffective when in a solid state and conductively effective when in a liquid state.

2. A thermoelectric cell comprising, a pair of thermally responsive half-cell units supercoincidently retained within a housing and having an electrode in common, a normally latent thermal energy unit retained within said housing in proximate relationship with said pair of units for heating said pair of units upon activation of said thermal energy unit, said thermal energy unit being a zirconium-treated paper pre-impregnated with aluminum silica beads of 1 to 3 mil. diameter, said housing being defined by an enclosed casing having the interior thereof coated with calcium whereby the calcium coating on a pair of opposing sides of said casing defines the other electrode, respectively, of each of said pair of units, and an electrolyte interposed between said common electrode and the calcium coating on each of said pair of opposing sides whereby said common electrode and the calcium coating on said pair of opposing sides form the cathode and anode, respectively, for each of said half-cell units, said electrolyte being of such substance as to be conductively ineffective when in a solid state and conductively effective when in a liquid state.

3. The thermoelectric cell of claim 1, wherein said casing is a cup-shaped container of rectangular configuration with an upper closure plate for retaining said common electrode, electrolyte and thermal energy unit within the confines thereof, and further includes a conductive member integral with a sidewall thereof and extending outwardly therefrom, said conductive member being adapted to be retained within another like thermoelectric cell and forming the common electrode in said like thermoelectric cell.

4. A thermal battery cell adapted to be electrically serially interlinked with a series of like battery cells to form a battery thermally rendered initiatable, comprising a metallic cup-shaped retainer having the interior thereof coated with calcium, a conductive tab integral with a sidewall of said retainer and extending outwardly therefrom, a first layer of electrolyte disposed in the interior of said retainer, a second layer of similar electrolyte so disposed with respect to said first layer as to have the conductive tab from the preceding cell interposed therebetween, non-conductive means so disposed in the interior of said retainer as to insulate the conductive tab interposed between said first and second layers from the walls of said retainer, a normally latent exothermic composition filling the remainder of the interior of said retainer for generating sufficient heat to melt said first and second layers of electrolyte upon initiation of said battery, said exothermic composition being spun glass ribbon pretreated with zirconium, and a calcium coated closure plate for compactly sealing the interior of said retainer, said electrolyte being of such substance as to be conductively ineffective when in a solid state and conductively effective when in a liquid state.

5. A thermal battery cell adapted to be electrically serially interlinked with a series of like battery cells to form a battery thermally rendered initiatable, comprising a metallic cup-shaped retainer having the interior thereof coated with calcium, a conductive tab integral with a sidewall of said retainer and extending outwardly therefrom, a first layer of electrolyte disposed in the interior of said retainer, a second layer of similar electrolyte so disposed with respect to said first layer as to have the conductive tab from the preceding cell interposed therebetween, non-conductive means so disposed in the interior of said retainer as to insulate the conductive tab interposed between said first and second layers from the walls of said retainer, a normally latent exothermic composition filling the remainder of the interior of said retainer for generating sufficient heat to melt said first and second layers of electrolyte upon initiation of said battery, said exothermic composition being a zirconium-treated paper pre-impregnated with aluminum silica beads of 1 to 3 mil. diameter, and a calcium coated closure plate for compactly sealing the interior of said retainer, said electrolyte being of such substance as to be conductively ineffective when in a solid state and conductively effective when in a liquid state.

6. A cell according to claim 4 wherein the exothermic composition extends outwardly from the retainer and coextensively with the integral conductive tab to connect with the exothermic composition of the next succeeding cell in the series of interlinked cells to define a continuous strip of exothermic composition for the series of interlinked cells.

References Cited by the Examiner
UNITED STATES PATENTS

| | | | |
|---|---|---|---|
| 856,162 | 6/07 | Kitsee | 136—90.5 X |
| 2,081,926 | 6/37 | Gyuris | 136—83 |
| 2,102,701 | 12/37 | Gyuris | 136—83 |
| 2,594,879 | 4/52 | Davis | 136—114.2 X |
| 2,631,180 | 3/53 | Robinson | 136—153 |
| 2,689,876 | 9/54 | Lehovec | 136—153 |

FOREIGN PATENTS 8,642   5/16   Great Britain.

OTHER REFERENCES

Getman and Daniels: "Outlines of Physical Chemistry," 7th Edition, pages 432, 433, John Wiley and Sons, Inc. (1943). (Copy in Scientific Library and Div. 46.)

Goodrich et al.: "J. Electrochem. Soc.," vol. 99, pp. 207C, 208C, Aug. 1952. (Copy in Sci. Library.)

WINSTON A. DOUGLAS, *Primary Examiner.*

ROGER L. CAMPBELL, LEON D. ROSDOL,
*Examiners.*